United States Patent
Szucs et al.

(10) Patent No.: US 7,302,474 B2
(45) Date of Patent: Nov. 27, 2007

(54) REMOTE DEVICE DIAGNOSTICS

(75) Inventors: Paul Szucs, Ostfildern (DE); Matthias Mayer, Stuttgart (DE)

(73) Assignee: Sony Deutschland GmbH, Cologne (DE)

(*) Notice: Subject to any disclaimer, the term of this patent is extended or adjusted under 35 U.S.C. 154(b) by 998 days.

(21) Appl. No.: 10/059,991

(22) Filed: Jan. 29, 2002

(65) Prior Publication Data
US 2002/0188741 A1 Dec. 12, 2002

(30) Foreign Application Priority Data
Jan. 31, 2001 (EP) ................................. 01102230

(51) Int. Cl.
*G06F 15/16* (2006.01)
(52) U.S. Cl. ............... 709/217; 709/224; 709/203; 714/25; 714/26
(58) Field of Classification Search ............... 709/253, 709/223, 203, 217, 224; 371/20; 370/466, 370/402; 714/25, 26
See application file for complete search history.

(56) References Cited

U.S. PATENT DOCUMENTS

| | | | | |
|---|---|---|---|---|
| 5,923,673 A | * | 7/1999 | Henrikson ............... | 714/712 |
| 5,982,753 A | * | 11/1999 | Pendleton et al. ........ | 370/252 |
| 6,269,330 B1 | * | 7/2001 | Cidon et al. ............ | 714/43 |
| 6,795,799 B2 | * | 9/2004 | Deb et al. ............... | 702/188 |
| 6,857,013 B2 | * | 2/2005 | Ramberg et al. ......... | 709/223 |
| 2002/0181497 A1 | * | 12/2002 | Mano et al. .............. | 370/466 |

FOREIGN PATENT DOCUMENTS

| WO | WO 00 28690 | 5/2000 |
|---|---|---|
| WO | WO 00 45265 | 8/2000 |
| WO | WO 00 48075 | 8/2000 |

OTHER PUBLICATIONS

Melatti L et al.: "Testing Methodology for Firewire" IEEE Design & Test of Computers, IEEE Computers Society, Los Alamitos, US, vol. 16, No. 3, Jul. 1999, pp. 102-110, XP000849069.

* cited by examiner

*Primary Examiner*—William Vaughn
*Assistant Examiner*—Djenane Bayard
(74) *Attorney, Agent, or Firm*—Oblon, Spivak, McCellland, Maier & Neustadt, P.C.

(57) ABSTRACT

A method for diagnosing an IEEE 1394 home network device (6, 7) from remote is proposed. The communication between a remote testing device (2) and the IEEE 1394 home network device (6, 7) is split into two parts: between the remote testing device (2) and a gateway (4) of the home network (5) preferably TCP/IP is used as communication protocol. Inside the home network (5), i. e. between the gateway (4) and the IEEE 1394 home network device (6, 7), an IEEE 1394 low level communication protocol is used. As this IEEE 1394 low level communication protocol is common to all home network protocols employed by IEEE 1394 home network devices (6, 7), this communication method is independent of the home network protocol used by the IEEE 1394 home network devices (6, 7).

13 Claims, 4 Drawing Sheets

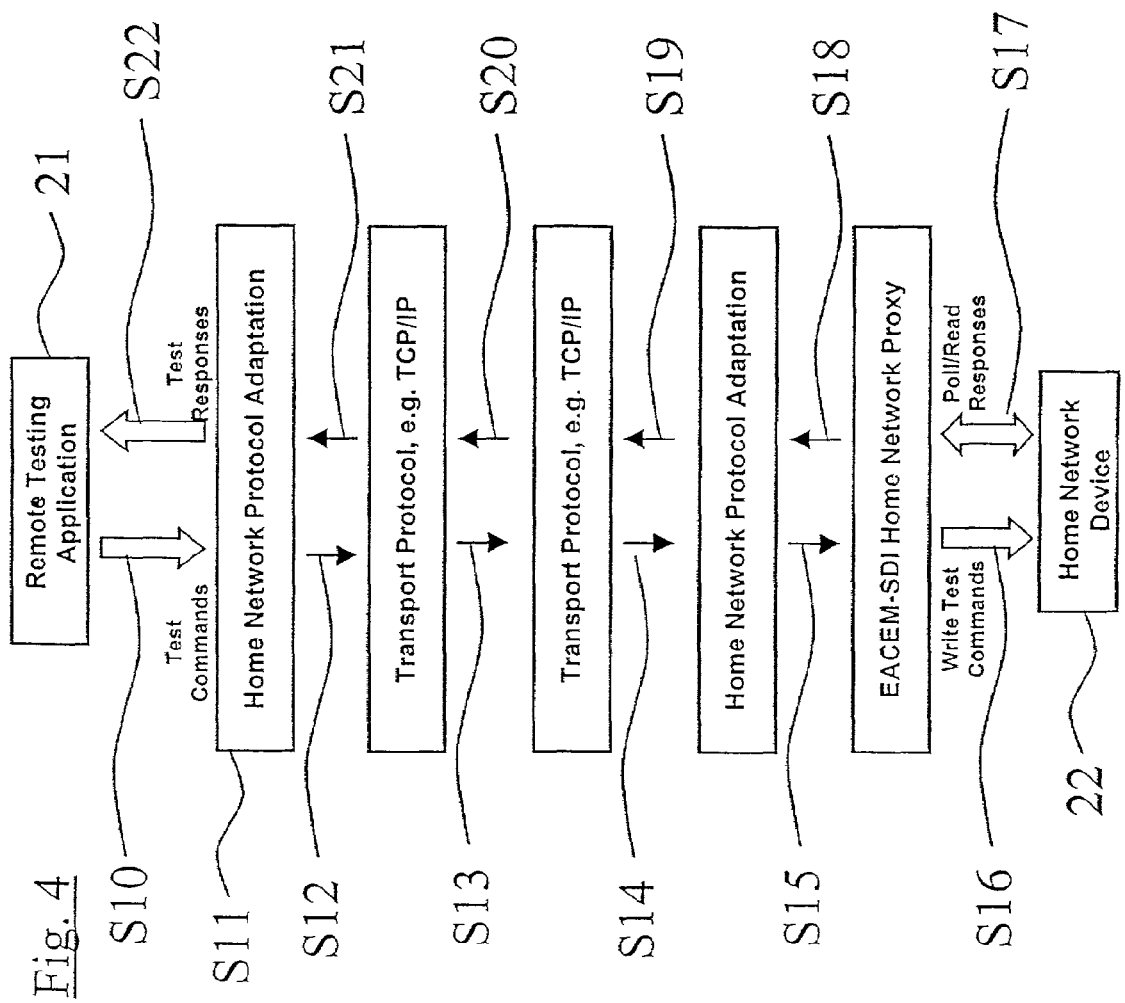

REMOTE DEVICE DIAGNOSTICS

DESCRIPTION

Figure 1:
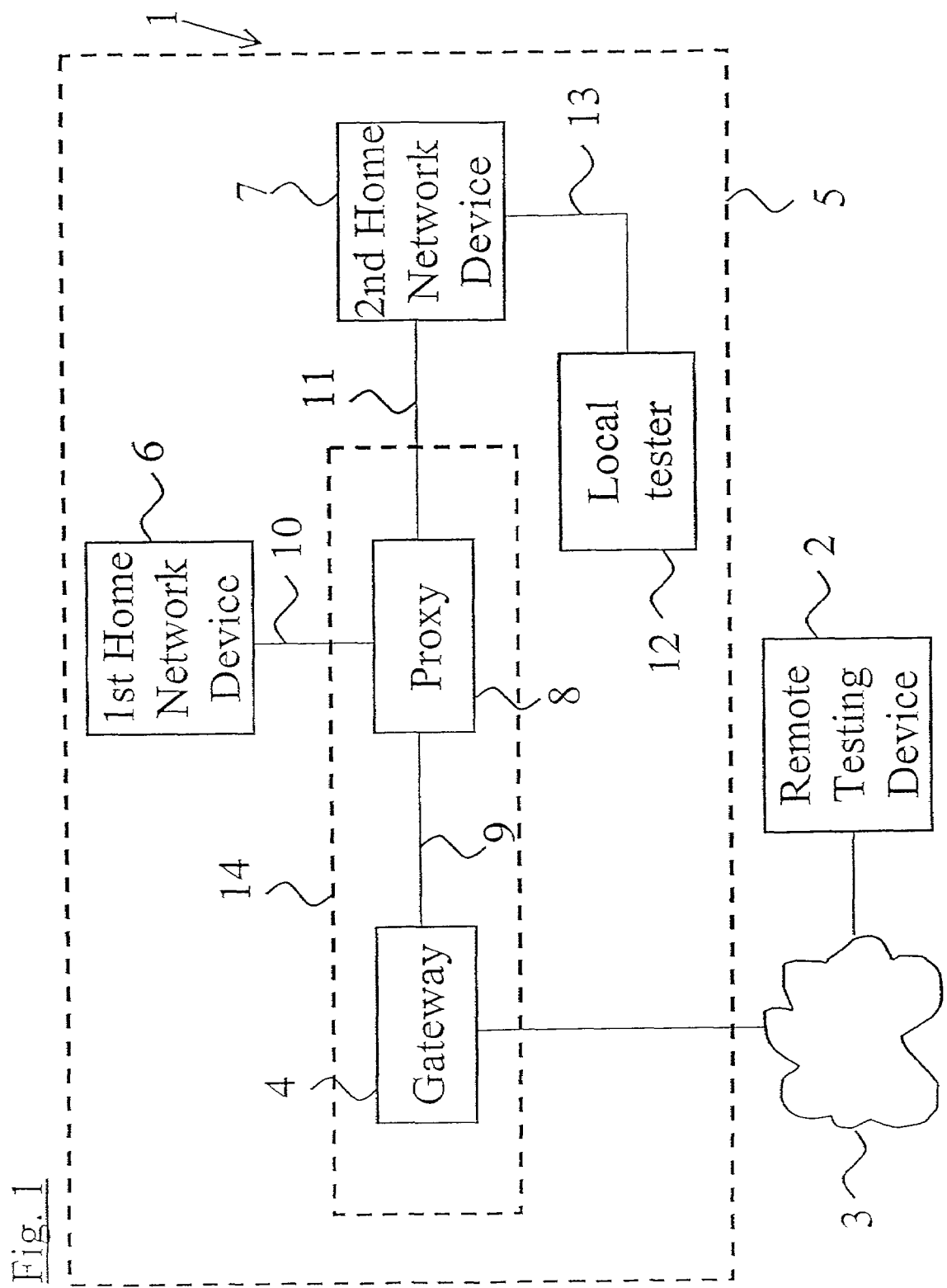

The invention relates to a method for communicating between a remote testing device and an IEEE 1394-2000 home network device, and to a remote testing device, a communication protocol interface and a service diagnosting system necessary to perform said method.

It is known to control and diagnose home network devices from remote. To do this, the home network usually comprises a gateway which can be contacted by a remote testing device being connected via a remote communication network work like the internet to the gateway. The gateway acts like an interface to translate commands sent by the remote testing device into appropriate home network commands, which are then sent to the respective home network devices.

The remote testing device usually establishes a TCP/IP connection over the remote communication network to communicate with the gateway. Then, a browser software installed on the remote testing device can use the established TCP/IP connection to communicate with the gateway. The gateway extracts communication information sent by the browser software via TCP/IP from the TCP/IP protocol and encapsulates the extracted communication information into a home network protocol being used by the respective home network device, like AV/C. Finally, the communication information is sent by the gateway via AV/C to the respective home network device to control it.

However, there is the problem that different home network devices may use different home network communication protocols like AV/C or HAVi, respectively. As a consequence, if the gateway does not provide the complete functionality of translating commands sent by the remote testing device into each home network communication protocol, it is not possible for the remote testing device to communicate with all home network devices. Further, such a flexible translating process would require a lot of computational resources.

It is an object of the present invention to provide a communication method, in particular a communication method for diagnosing IEEE 1394 supporting home network devices, which ensures that communication between a remote testing device and all IEEE 1394 supporting home network devices is possible regardless of the home network communication protocol required to communicate with the IEEE 1394 supporting home network device, respectively.

To solve this object, the present invention provides a method for communicating between a remote testing device and an IEEE 1394 home network device being located in a home network, wherein said remote testing device is connected with said home network via a remote communication network, which is characterized by communicating on a remote communication protocol basis between said remote testing device and a communication protocol interface which is part of said home network, and communicating on an IEEE 1394 low level communication protocol basis between said communication protocol interface and said IEEE 1394 home network device.

Further, the present invention provides a communication protocol interface being a part of a home network for transferring communication information encapsulated within a first/second communication protocol frame into a second/first communication protocol frame, which is characterized by a first IEEE 1394 interface, functionality for extracting device status information from an IEEE 1394 supporting home network device via said first IEEE 1394 interface and an IEEE 1394 connection linking said IEEE 1394 supporting home network device to said first IEEE 1394 interface by using a low level communication protocol frame of said first IEEE 1394 interface a said first communication protocol frame, and a remote communication protocol interface and functionality for communicating with a remote testing device via said remote communication protocol interface and a remote communication network linking said remote testing device to said remote communication protocol interface by using said second communication protocol frame.

In addition, the present invention provides a remote testing device for extracting device status information of an IEEE 1394 home network device being located in a home network, wherein said remote testing device is connected with said home network via a remote communication network, which is characterized by means for encapsulating/decapsulating communication information from/into a communication protocol frame, and means for sending/receiving said communication protocol frame via said remote communication network to/from said IEEE 1394 home network device by using a remote communication protocol.

Last, the present invention provides a service diagnostic system, which comprises
 a remote testing device according to the invention,
 an IEEE 1394 supporting home network device,
 a communication protocol interface according to the invention,
 an IEEE 1394 home network connecting said IEEE 1394 supporting home network device to said communication protocol interface,
 a remote communication network linking said remote testing device to said home network, wherein said communication protocol interface controls a device status information extraction process of said IEEE 1394 supporting home network device according to instructions by said remote testing device, and controls a sending process of said extracted device status information to said remote testing device, wherein said device status information extraction process is executed on an IEEE 1394 low level communication protocol basis.

Preferred embodiments of this method, remote testing device, communication protocol interface, and service diagnosting system which are defined in independent claims 1, 13, 19 and 20, respectively, are respectively defined in the respective following dependent claims.

An important aspect of the present invention is that a communication method is employed which uses IEEE 1394 functionality within the home network, but which is independent of any home network communication protocol or environment. This is realized by using IEEE 1394 low level base mechanisms of asynchronous read and write transactions which are underlying all home network communication protocols employed by IEEE 1394 supporting devices. Preferably, a Quadlet read/write protocol is used. Thus, one single communication protocol is sufficient to contact all home network devices within the home network. In the following, the IEEE 1394 low level base communication mechanism will be referred to as service diagnostic interface communication protocol (SDI communication protocol), which has been described in the applicants parallel european patent application "Device Diagnostics" which content is herewith incorporated into this specification.

The communication between the remote testing device and the home network device can be split into at least two communication sections. The first communication section consists of a remote communication network between the remote testing device and the communication protocol interface which is part of the home network. The communication via the first communication section is done by using a remote communication protocol like TCP/IP. The second communication communication section consists of an IEEE 1394 connection like an IEEE 1394 serial bus between the communication protocol interface and the home network device which has to be diagnosed by the remote testing device. The communication via the second communication section is done by using the SDI communication protocol.

The communication protocol interface may consist of hardware and/or software, and may be located/represented in a gateway connecting the home network to the remote communication network. However, the communication protocol interface may also be "distributed" over several devices within the home network. For example, a first unit of the communication protocol interface may be located in a gateway, and a second unit may be located in a proxy. The gateway and the proxy may be connected with each other via an IEEE 1394 connection. In this case, the communication between the remote testing device and the home network device can be split into at least three communication sections. The first communication section consists of a connection between the remote testing device and the communication protocol interface, the second communication section consists of an IEEE 1394 connection within the communication protocol interface between its first unit and the third communication section consists of an IEEE 1394 connection between the second unit of the communication network and the home network device. In this example, the communication via the second section is preferably done by using the home network communication protocol like AV/C (audio video/ control).

In the examples given above, the gateway acts as an interface between the communication protocol used to transport communication information via the first communication section, and the communication protocol applied over the following second communication section, which may be the home network communication protocol, or the SDI communication protocol. This means, for example, that communication information carried by the remote communication protocol is extracted therefrom and is encapsulated into the home network communication protocol or the SDI communication protocol. In case of a "distributed" communication protocol interface, the communication information is preferably transported within the home network on a home network protocol basis via the second communication section to the proxy, which extracts the communication information from the home network communication protocol. The proxy analyzes the communication information and starts to communicate with the home network device via the third communication section by using the SDI communication protocol. The proxy may generate new communication information according to a result of the alanyzing process of the received communication information and send this generated communication information to the home network device. Alternatively, the proxy may just encapsulate the received, decapsulated communication information unchanged into the SDI communication protocol.

The capability of the proxy to analyze and to generate communication information makes it possible to "instruct" the proxy how to communicate with the home network device by sending communication information to the proxy. For example, the proxy may initiate self tests within the home network device, or read out device-specific information according to instructions received in form of communication information. After having extracted the device status information, the proxy encapsulates the extracted device status information as communication information into the home network communication protocol and sends it via the second communication section back to the gateway, which transfers the communication information into the remote communication protocol and sends it back to the remote testing device. An advantage of this communication mechanism is that it is sufficient to provide only one TCP/IP supporting device within the home network which supports a remote communication protocol like TCP/IP. The proxy itself does only have to support the home network communication protocol like AV/C, which is likely to be supported by the proxy anyhow.

As shown above, the remote testing device does only have to send command information instructing the communication protocol interface to extract device status information from the home network device to the communication protocol interface. The extraction process of the device status information is then organized by the communication protocol interface itself. Preferably, only when the whole device status information extracting process has been completed, the resulting data is sent back to the remote testing device in one single communication transaction. Thus, the communication via the first communication section is very simple, as it may comprise only one single instruction command sent by the remote testing device to the communication protocol interface and and one single sending transaction of extracted device status information from the communication protocol interface to the remote testing device. The advantage thereof is that the remote testing device does not necessarily have to comprise SDI communication protocol functionality, but nevertheless is capable of communicating with all home network devices. The SDI communication protocol functionality is preferably completely located within the communication protocol interface.

Preferably, the communication information to be sent by the remote testing device may first be wrapped into a home network communication protocol frame, before sending the home network communication protocol frame via the remote communication protocol to the communication protocol interface. A communication protocol interface would then only have to extract the home network communication protocol frame, and send the frame unchanged to the proxy. A decapsulation of the communication information is not necessary. Similarly, extracted device status information may be first wrapped into a home network communication protocol frame before transporting the frame via the remote communication protocol to the remote testing device. In the case that the proxy is located within the gateway itself, it may be advantageous to wrap communication information into a SDI communication protocol frame before transporting this frame via the remote communication protocol to the gateway, and the gateway could directly extract the SDI communication protocol frame from the remote communication protocol and send this frame directly to the home network device. In this case, the translation of the communication information into the home network communication protocol can be left, as it is not necessary to transport the communication information within the home network to the proxy, which would make it necessary to encapsulate command information formation within a home network protocol frame.

In another embodiment, communication information is first wrapped into a SDI communication protocol frame, wherein this frame is then wrapped itself into a home network communication protocol frame, and the home network communication protocol frame is then sent by using the remote communication protocol. This embodiment may be used in case of a distributed communication protocol interface, where the proxy comprises no functionality to analyze and generate communication information. The only task of the proxy would be to decapsualte/encapsulate the SDI communication protocol frame from/into the home network communication protocol frame and to send/receive the SDI communication protocol frame to/from the home network device.

The clear separation of the device status information extracting process which is completely managed by the proxy, or, to be more general, by the communication protocol interface, and the communication between the remote testing device and the proxy (communication protocol interface) has the advantage that the characteristics of the SDI communication process that make this process impractical for direct use as the remote diagnosis protocol can be encapsulated within the home network protocol. That is, after a selftest of the home network device has been initiated by the proxy, the proxy has to continuously poll-read response code registers within the home network device until the device has completed the selftest, which could in practice take several seconds to complete. This mechanism however, is not suitable to be done from remote. The remote testing device does not have to continuously poll-read, but only receives extracted device status information after the extraction process has been entirely finished.

Figure 2:
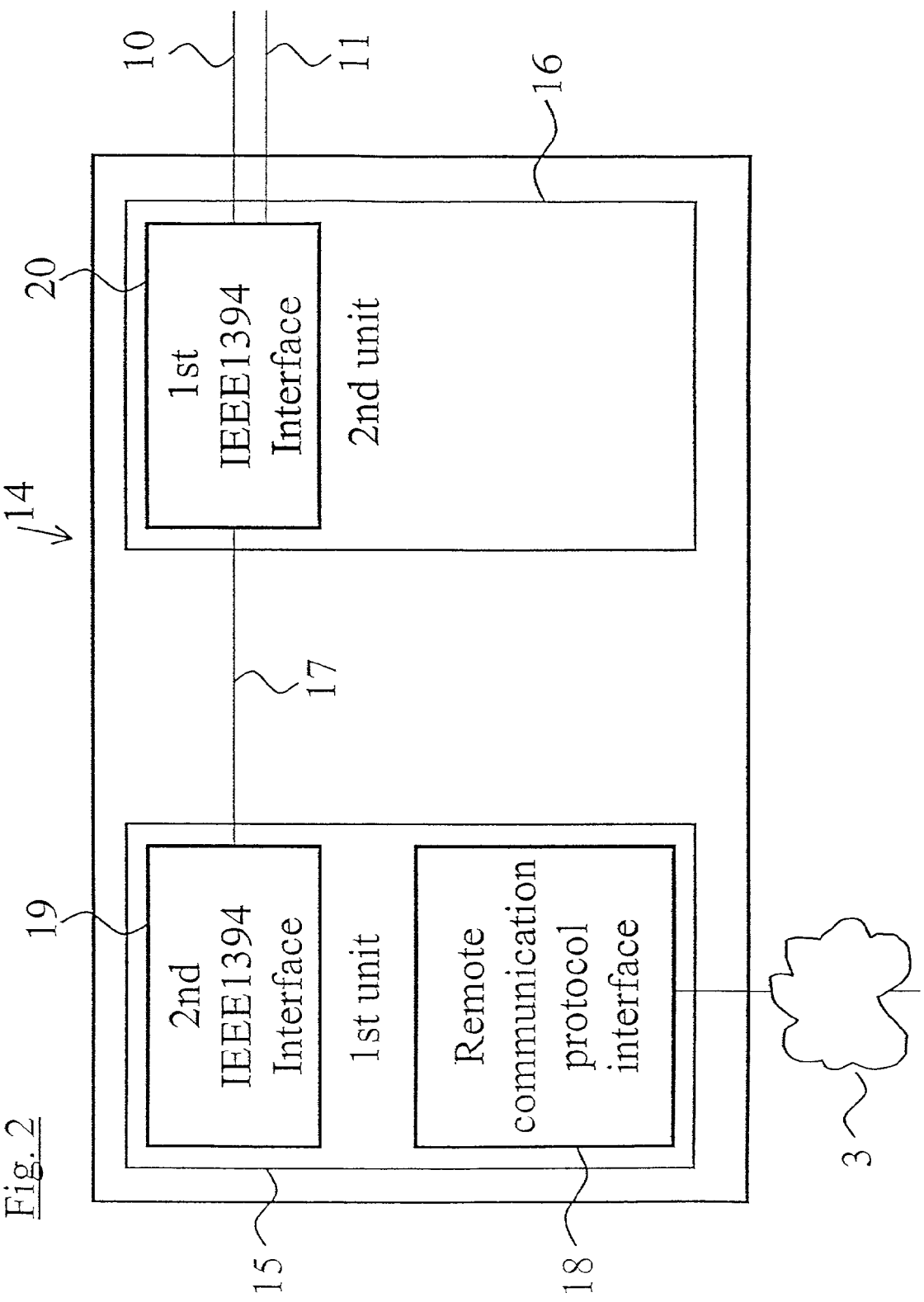
Figure 3:
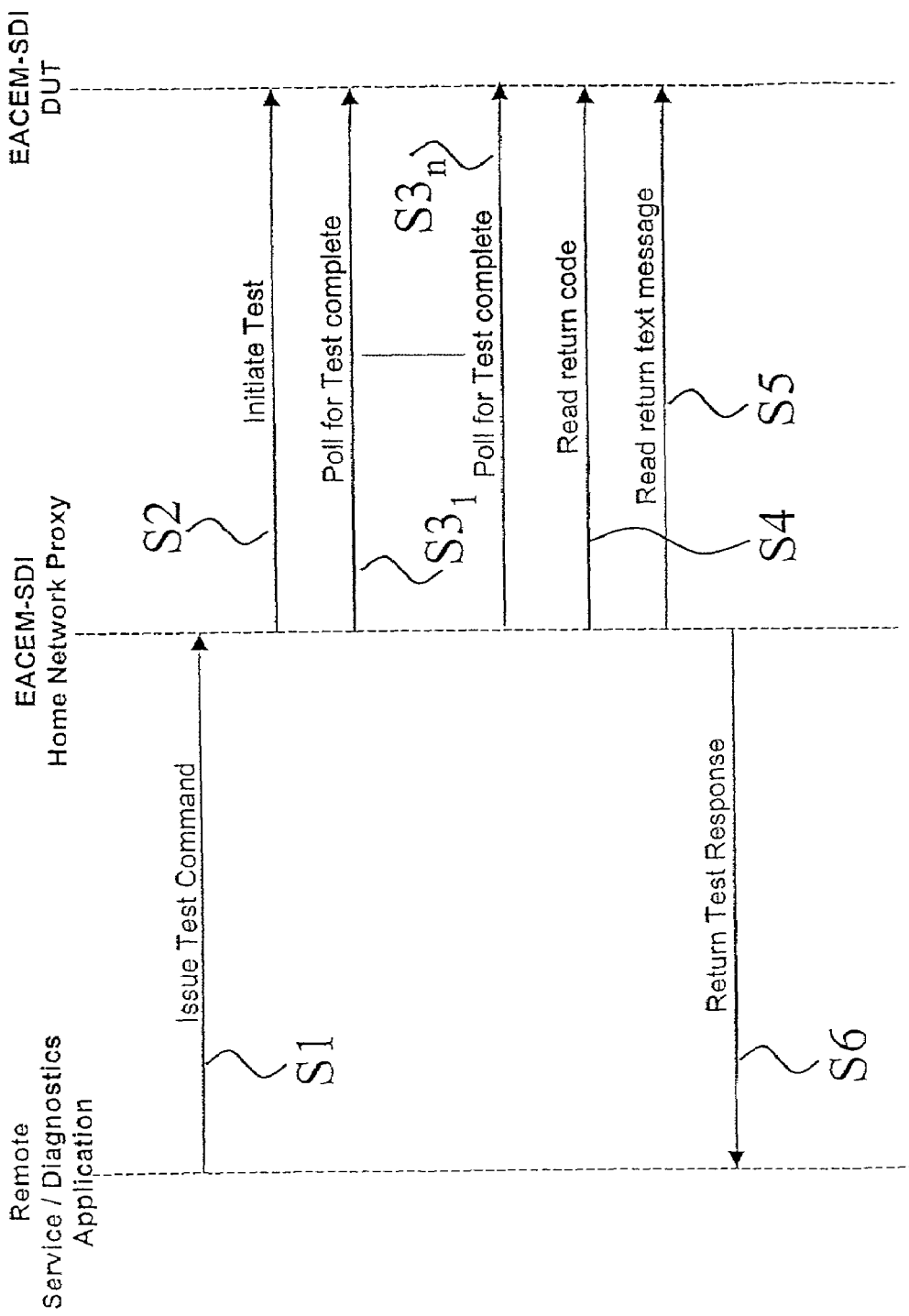

Further features and advantages of a preferred embodiment according to the present invention will be explained below in conjunction with the accompanying drawings, in which FIG. 1 shows a schematic drawing of a service diagnostic system comprising a remote testing device and a local testing device according to the present invention;

FIG. 2 shows a schematic drawing of a communication protocol interface according to the present invention;

FIG. 3 shows a schematic drawing of the mechanism combining a SDI communication process to extract device status information extraction with a remote communication process according to the present invention; and FIG. 4 shows a schematic drawing of a home network remote diagnosis protocol stack describing principles of an encapsulation and decapsulation process of communication information during the communication process between the remote testing device and the home network device.

In the following description, making reference to FIG. 1, a preferred embodiment of a service diagnostic system is described.

A service diagnostic system 1 comprises a remote testing device 2, which is connected via a remote communication network 3 to a gateway 4. The gateway 4 is part of a home network 5, which comprises a first home network device 6 and a second home network device 7. The home network 5 further comprises a proxy 8 being connected to the gateway 4 via a first IEEE 1394 serial bus 9. The proxy 8 is further connected to the first home network device 6 via a second IEEE 1394 serial bus 10, and to the second home network device via a third IEEE 1394 serial bus 11. The home network 5 may further comprise a local tester 12 being connected to the second home network device 7 via a fourth IEEE 1394 serial bus 13. In this embodiment, the sum of the gateway 4, the proxy 8 and the first IEEE 1394 serial bus 9 may be regarded as a communication protocol interface 14.

Now, making reference to FIG. 2, a preferred embodiment of a communication protocol interface will be described.

A communication protocol interface 14 comprises a first unit 15 and a second unit 16, which are connected via an IEEE 1394 connection 17. The first unit 15 comprises a remote communication protocol interface 18 and a first IEEE 1394 communication protocol interface 19. The first unit 15 further comprises functionality for extracting/encapsulating a home network communication protocol frame from/into a remote communication protocol. The second unit 16 comprises a first IEEE 1394 interface 20 for communicating with the first unit 15 and for communicating with the home network devices 6, 7. The second unit 16 further comprises functionality for extracting/encapsulating a SDI communication protocol frame from/into a home network communication protocol frame, and for interpreting received command information and functionality for controlling a SDI device status information extraction process of the home network devices 6, 7 being connected to the second unit 16 via the first IEEE 1394 interface 20 and the second and the third IEEE 1394 serial bus 10, 11, respectively. The first unit 15 may be regarded as the gateway 4, the second unit 16 may be regarded as the proxy 8, and the IEEE 1394 connection 17 may be regarded as the first IEEE 1394 serial bus 9.

In the following, making reference to FIG. 3, a preferred embodiment of a mechanism combining a SDI device status information extraction process with a remote communication process is described.

In a first step S1, the remote testing device 2 sends a test command to the communication protocol interface 14, (which is represented in FIG. 3 by an EACEM (European Association of Consumer Electronic Manufacturers)-SDI home network proxy) which interprets a command, and initiates in a step 32 a self test inside a home network device 6, 7 (which is represented in FIG. 3 by an EACEM-SDI-DUT (Device which is Under Test)) by using the SDI communication protocol. After having initiated the test, the communication protocol interface 14 polls at preferably regular time intervals (steps $S3_1$ to $S3_n$) if the self test within the home network device has already been completed. When the self test has been completed, the return code of the self test routine is read in a step S4. Then, in step S5, a text message is read from the device 6, 7. The text message and the return code are collected as extracted device status information and are sent back to the remote testing device 2 by a single communication transaction in step S6.

In the following, making reference to FIG. 4, a preferred embodiment of using a home network remote diagnosis protocol stack is described.

A remote testing application 21 running on a remote testing device 2 generates communication information in a first step 310, and wraps the communication information in a second step S11 into a home network communication protocol frame. In a third step S12, the home network communication protocol frame is encapsulated within a remote communication protocol, for example TCP/IP. In a fourth step S13, the home network communication protocol frame is transported via the remote communication protocol to the communication protocol interface 14, which decapsulates in a fifth step S14 the home network communication protocol frame from the remote communication protocol. Then, in a sixth step, the home network communication protocol frame is sent to the proxy 8, which in a seventh step S15 extracts command information from the home network communication protocol frame. Then, the proxy processes the command information and generates in an eighth step S16 appropriate SDI communication protocol frames containing command information for the home network device 22. After having extracted device status information from the home network device 22 using the SDI communication protocol in a nineth step S17, the proxy encapsulates the extracted information in a tenth step S18 into a home network communication protocol frame and sends it back to the gateway 4, which in an eleventh step S19 encapsulates the home network communication protocol frame into the remote communication protocol. Then, the home network communication protocol frame is sent in a twelveth step S20 via the remote communication protocol to the remote testing device 21, which decapsulates in an thirteenth step S21 the home network communication protocol frame from the remote communication protocol, and further extracts the device status information in a fourteenth step S22 from the home network communication protocol frame.

In order to communicate between the gateway 4 and the proxy 8, it is necessary that the proxy 8 can be accessed by an API (application program interface). Generally, the proxy API should show the following input- and output parameters:

The input parameters necessary for initiating a test in a home network device 6, 7 are
- a GUID (identifier) of the home network device,
- a test code, The output parameters containing extracted device status information are
- the GUID of the home network device 6, 7,
- a response code,
- a response text length,
- a response text, as a Byte/character string.

The way this "generalised" API is implemented depends on the nature of the home network protocol supported by the proxy 8. If AV/C is used as home network protocol, for example, it is advantegous to define a new standardised AV/C command used to communicate with the proxy API. For example, if an AV/C command frame with command type CONTROL is sent to the proxy API, a home network device test is initiated by the proxy 8 according to communication information contained within the AV/C command frame. If an AV/C command frame with command type STATUS is sent to the proxy API, no home network device test is carried out, and the current output parameters are returned in an AV/C response frame.

Alternatively, it is possible to adapt a vendor specific command frame already contained in the current AV/C command set.

If HAVi is used as home network protocol, for example, the proxy 8 should provide a new SDI FCM as API (function control module) in its DCM (device control module). As a consequence, the method of accessing the SDI mechanisms would be the same as the method for accessing HAVi in general.

In the following description, a preferred embodiment of a SDI FCM for HAVi is described:

---

DiagProxy::ExecTest

Prototype

Status DiagProxy::ExecTest(in TestCode testCode,
            out TestResponseCode respCode,
            out wstring testResponseText)
    Parameters testCode - identifies the test to be performed
    testResponseCode - the code returned by the target device
    testResponseText - the corresponding text -continued Description DiagProxy::ExecTest initiates the given test, indicated by the testCode argument, in the target device.
    Error codes DiagProxy::ENOT_??? - the . . .

---

DiagProxy::GetStatus

Prototype

Status DiagProxy::GetStatus(out TestResponseCode respCode,
            out wstring testResponseText)
    Parameters testResponseCode - the code returned by the target device
    testResponseText - the corresponding text
    Description DiagProxy::GetStatus retrieves the diagnostic status of the target device without initiating any test command.
    Error codes DiagProxy::ENOT_??? - the . . .

---

The invention claimed is:

1. A method for communicating between a remote testing device and an IEEE 1394 home network device located in a home network, wherein said remote testing device is connected with said home network via a remote communication network, comprising:
   communicating on a remote communication protocol basis between said remote testing device and a communication protocol interface which is part of said home network; and
   communicating on an IEEE 1394 low level communication protocol basis between said communication protocol interface and said IEEE 1394 home network device;
   sending commands as communication information via said remote communication network from said remote testing device to said communication protocol interface to instruct said communication protocol interface how to communicate with said home network device on said IEEE 1394 low level communication protocol basis;
   extracting device status information from said home network device on the basis of said IEEE 1394 low level communication process between said home network device and said communication protocol interface according to said commands sent by said remote testing device; and
   sending extracted device status information as communication information via said remote communication network from said communication protocol interface to said remote testing device, wherein said sending process of said extracted device status information is executed only after said device status information extracting process has been completed cording to said instructions of said remote testing device.

2. The method according to claim 1, further comprising:
   encapsulating/decapsulating communication information in/from a communication protocol frame, before/after transporting said communication protocol frame between said remote testing device and said communication protocol interface on said remote communication protocol basis.

3. The method according to claim 2, further comprising: encapsulating/decapsulating said communication information in/from a home network communication protocol frame.

4. The method according to claim 3, further comprising: transporting a home network communication protocol frame decapsulated/generated by said communication protocol interface within said communication protocol interface before transferring communication information contained within said home network communication protocol frame into an IEEE 1394 low level communication protocol frame or before transporting said communication protocol frame between said remote testing device and said communication protocol interface on said remote communication protocol basis.

5. The method according to claim 2, further comprising: encapsulating/decapsulating said communication information in/from an IEEE 1394 low level communication protocol frame.

6. The method according to claim 5, further comprising: encapsulating/decapsulating said IEEE 1394 low level communication protocol frame in/from a home network communication protocol frame.

7. A computer readable storage carrier including computer program instructions that cause a computer to implement a method of providing a communication protocol interface as a part of a home network for transferring communication information encapsulated within a first/second communication protocol frame into a second/first communication protocol frame, comprising: communicating on a remote communication protocol basis between said remote testing device and a communication protocol interface which is part of said home network; and communicating on an IEEE 1394 low level communication protocol basis between said communication protocol interface and said IEEE 1394 home network device; sending commands as communication information via said remote communication network from said remote testing device to said communication protocol interface to instruct said communication protocol interface how to communicate with said home network device on said IEEE 1394 low level communication protocol basis; extracting device status information from said home network device on the basis of said IEEE 1394 low level communication process between said home network device and said communication protocol interface according to said commands sent by said remote testing device; and sending extracted device status information as communication information via said remote communication network from said communication protocol interface to said remote testing device, wherein said sending process of said extracted device status information is executed only after said device status information extracting process has been completed cording to said instructions of said remote testing device.

8. The communication protocol interface according to claim 7, further comprising:
dividing into a first unit and a second unit wherein
said first unit comprises said remote communication protocol interface, a second IEEE 1394 interface and functionality for extracting/encapsulating a home network communication protocol frame from/into said second communication protocol frame; and
said second unit comprises said first IEEE 1394 interface and functionality for extracting/encapsulating an IEEE 1394 low level communication protocol frame from/into a home network communication protocol frame, said first and said second unit being connected via a home network connection to communicate between each other via said first and said second IEEE 1394 interface by using said home network communication protocol frame.

9. The communication protocol interface according to claim 8, wherein said first unit comprises a gateway connecting said home network to a remote communication network.

10. The communication protocol interface according to claim 8, wherein said second unit comprises a proxy.

11. The communication protocol interface according to claim 7, wherein said remote communication protocol interface supports TCP/IP.

12. The communication protocol interface according to claim 7, wherein said home network communication protocol interface supports AV/C and/or HAVi.

13. A remote testing device for extracting device status information of an IEEE 1394 home network device being located in a home network, wherein said remote testing device is connected with said home network via a remote communication network, comprising:
means for communicating on a remote communication protocol basis between said remote testing device and a communication protocol interface which is part of said home network; and
means for communicating on an IEEE 1394 low level communication protocol basis between said communication protocol interface and said IEEE 1394 home network device;
means for sending commands as communication information via said remote communication network from said remote testing device to said communication protocol interface to instruct said communication protocol interface how to communicate with said home network device on said IEEE 1394 low level communication protocol basis;
means for extracting device status information from said home network device on the basis of said IEEE 1394 low level communication process between said home network device and said communication protocol interface according to said commands sent by said remote testing device; and
means for sending extracted device status information as communication information via said remote communication network from said communication protocol interface to said remote testing device, wherein said sending process of said extracted device status information is executed only after said device status information extracting process has been completed according to said instructions of said remote testing device.

* * * * *